(12) United States Patent
Penello

(10) Patent No.: US 7,822,670 B2
(45) Date of Patent: Oct. 26, 2010

(54) PERFORMANCE RISK MANAGEMENT SYSTEM

(75) Inventor: Wayne Penello, Houston, TX (US)

(73) Assignee: Risked Revenue Energy Associates, Houston, TX (US)

( * ) Notice: Subject to any disclaimer, the term of this patent is extended or adjusted under 35 U.S.C. 154(b) by 677 days.

(21) Appl. No.: 11/771,336

(22) Filed: Jun. 29, 2007

(65) Prior Publication Data

US 2009/0006270 A1   Jan. 1, 2009

(51) Int. Cl.
*G06Q 40/00* (2006.01)
(52) U.S. Cl. .......................... 705/36 R; 705/35; 705/37
(58) Field of Classification Search .............. 705/36 R, 705/37, 35
See application file for complete search history.

(56) References Cited

U.S. PATENT DOCUMENTS 6,173,276 B1 *  1/2001  Kant et al. ................... 706/50
7,542,939 B2 *  6/2009  Ferguson et al. .............. 705/37
2002/0198811 A1 * 12/2002  Wizon et al. ................. 705/36
2003/0093351 A1 *  5/2003  Sarabanchong .............. 705/36

OTHER PUBLICATIONS

Barnett M.W.; Modeling and Simulation in Business Process Management; A publication of Gensym Corp., 2003.*

* cited by examiner

*Primary Examiner*—Jagdish N Patel
(74) *Attorney, Agent, or Firm*—Haynes and Boone, LLP

(57) ABSTRACT

The embodiments of this invention relate to methods for developing risked budgetary performance estimates by analyzing commodity price risk(s) utilizing cash-flow-at-risk assessments in combination with Monte Carlo simulations. This automated method for risk analysis, includes modeling assets of a portfolio as derivatives; collecting pricing data and volatility surfaces related to the derivatives; calculating and scaling simulated cash-flow-at-risk (CFAR) values to generate a risk profile; and evaluating the risk profile to determine if the risk profile meets predetermined risk characteristics or requires modification.

46 Claims, 8 Drawing Sheets

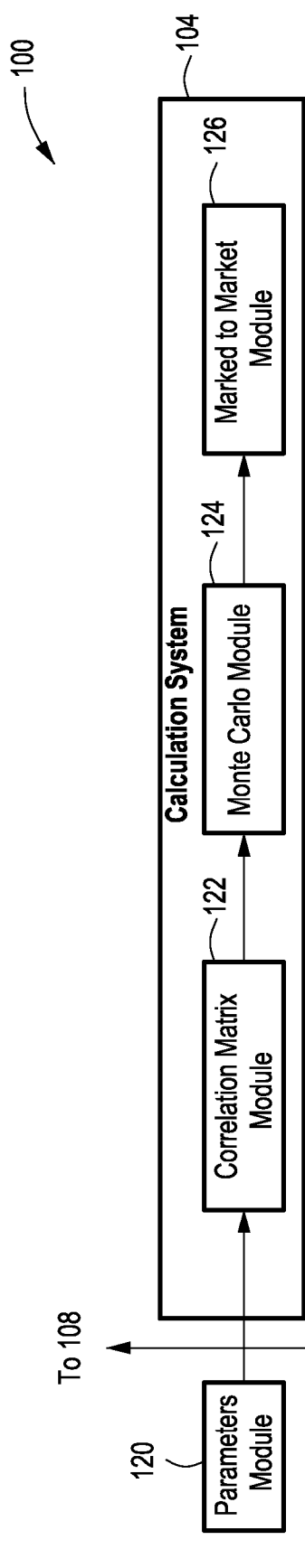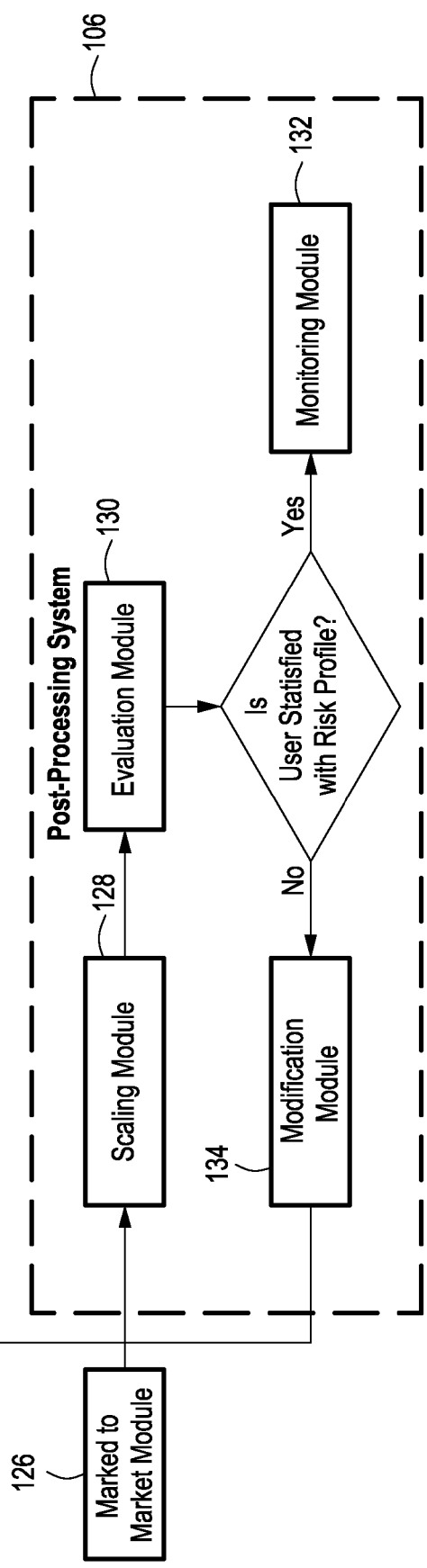

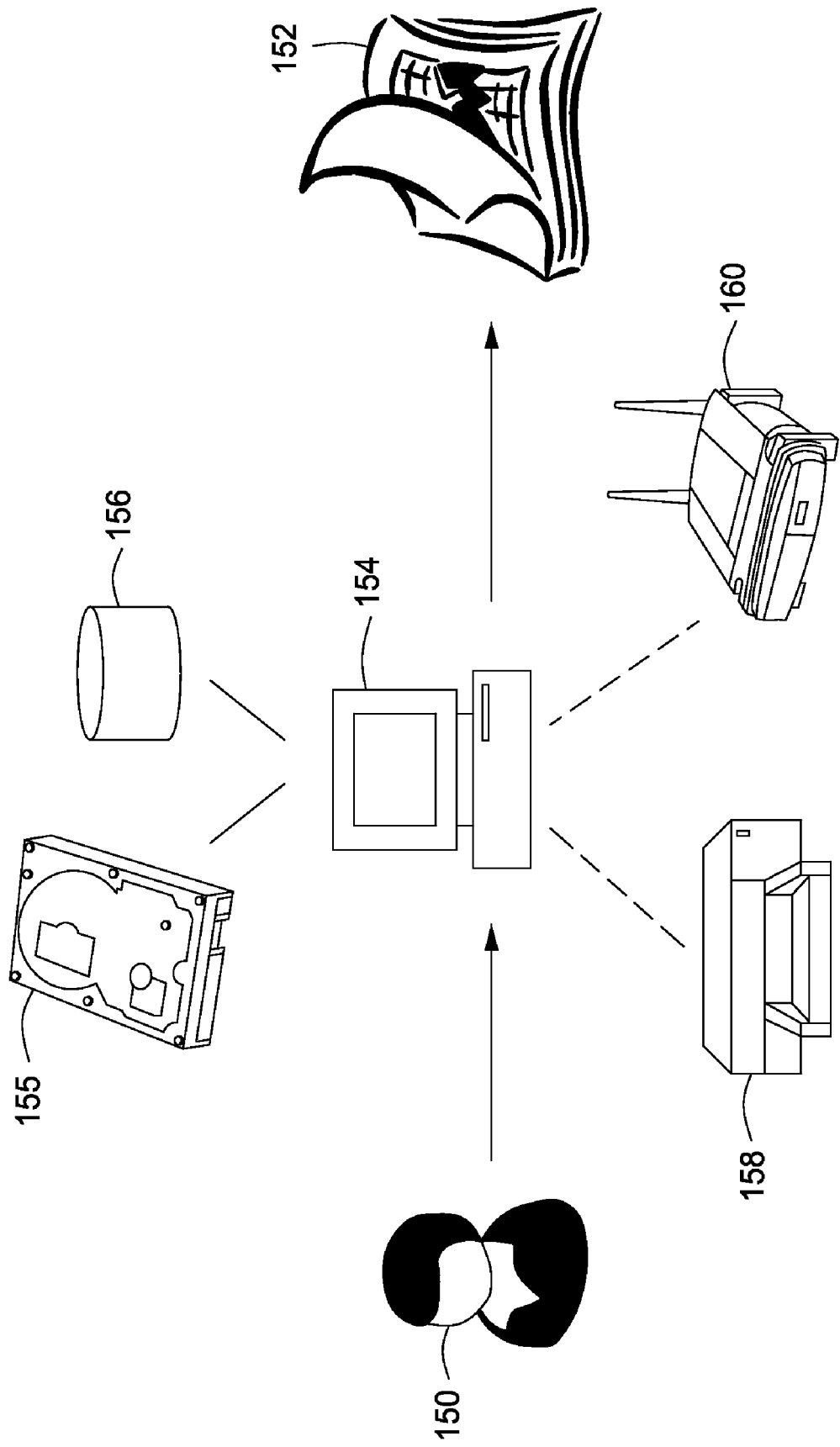

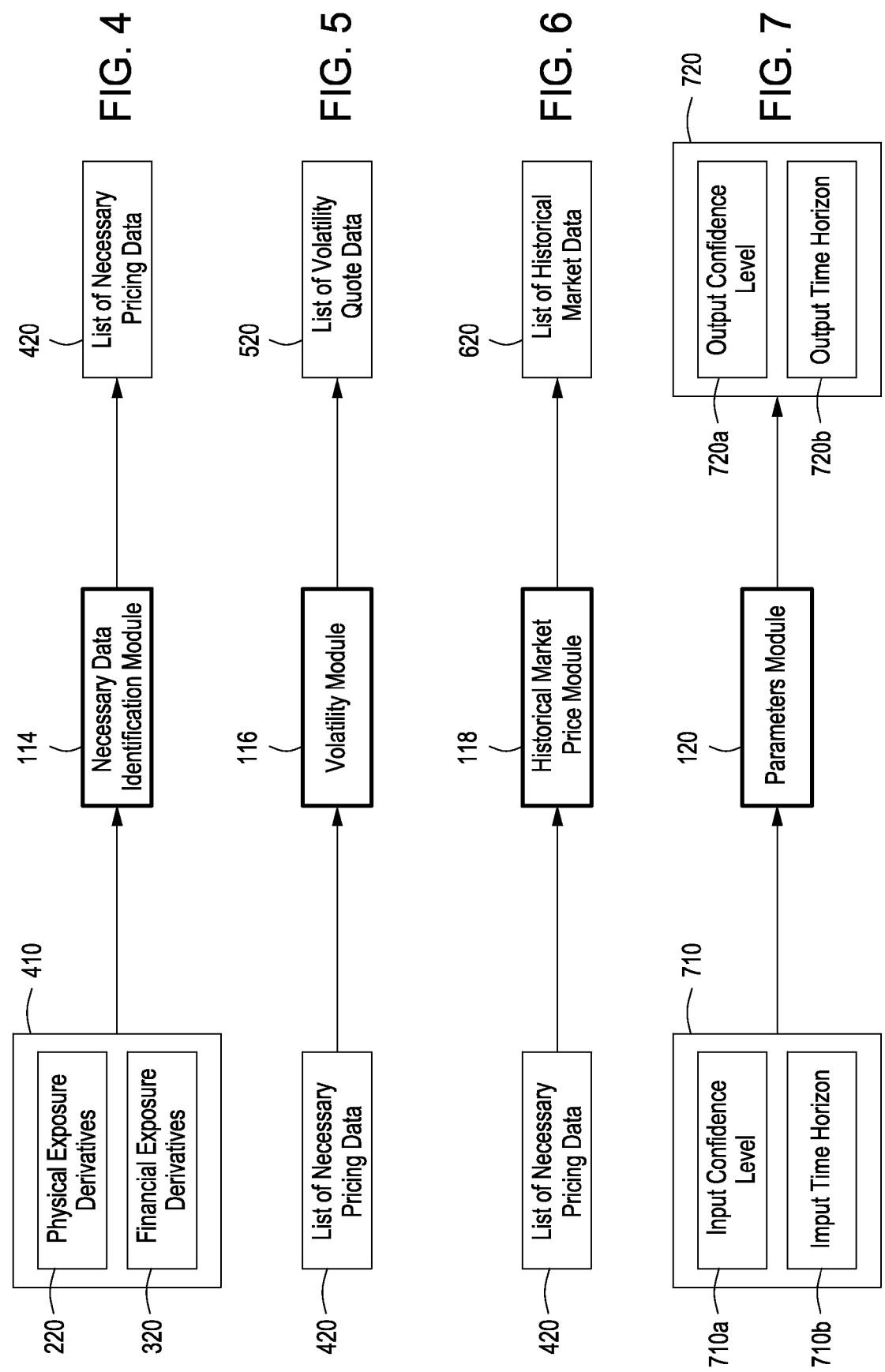

PERFORMANCE RISK MANAGEMENT SYSTEM

FIELD OF THE INVENTION

This invention relates to methods for developing risked budgetary performance estimates by analyzing commodity price risk(s) utilizing cash-flow-at-risk assessments in combination with Monte Carlo simulations.

BACKGROUND OF THE DISCLOSURE

Risk or financial modeling is generally known to refer to the use of formal econometric techniques to determine the aggregate risk in a portfolio, which may be a portfolio of physical and financial assets. Risk modeling may use a variety of techniques and parameters, such as market risk, value at risk, historical simulation, and/or extreme value theory to analyze a portfolio and make forecasts of the possible (or likely) gains or losses that may be incurred across one or more risks, where risks are typically grouped into categories, such as credit risks, commodity market fluctuation risks, liquidity risks, interest rate risks, operational risks, etc.

Many large financial intermediary firms use risk modeling to help portfolio managers assess the amount of capital reserves to maintain and to help guide their purchases and sales of various classes of financial assets. Quantitative risk analysis and modeling have become important in the light of corporate scandals in the past few years (most notably, Enron), Basel II, the revised FAS 123R and the Sarbanes-Oxley Act. In the past, risk analysis was done qualitatively, but the advent of powerful computing software (several exist, like Microsoft Excel, Quantrix Modeler and Risk Simulator and others), quantitative risk analysis can be executed using computer software.

Similarly, cash-flow-at-risk (CFAR) signifies the cash that would be received or paid in a portfolio of transactions with x % of certainty in a given time horizon, which may be yearly, quarterly, etc. CFAR looks at the cash-flow exchange upon settlement of the transaction. Therefore, CFAR is a measure that hedgers can use to identify the risk associated with changes in the prices of commodities that are sold or purchased.

Risk performance estimates are labeled to identify the applicable risk threshold for the measurement period under consideration. These risk thresholds may be expressed as a P-value in the form of P-x, where x is an integer from 1 to 99. For example, P-2 refers to the estimates generated at +2 standard deviations, and P-98 refers to the estimates generated at −2 standard deviations. The area beneath the bell curve that covers the range between +2 standard deviations and −2 standard deviations contains approximately 95% of the expected outcomes for the given portfolio during the measurement period, and approximately 2% of the remaining outcomes lie above and another 2% lie below this range. Therefore, approximately 98% of the expected outcomes can be found in the range above the low case (−2 standard deviations) estimate and 2% above the high case (+2 standard deviations) estimate.

A risk profile is a set of values which describe the theoretical distribution of financial outcomes of the value of a portfolio. The P-50 value is the midpoint of the distribution and is obtained by valuing the portfolio at the market prices. The P-2 and P-98 points of the distribution are determined through CFAR analysis by risking prices +/−2 standard deviations. The value of P-98 will estimate how the low price scenario will affect the portfolio value as measured at a price −2 standard deviations below the mean. The value of P-2 will estimate how the high price scenario will affect portfolio value as measured at a price +2 standard deviations above the mean. Additional points on this theoretical distribution could be determined through analysis to plot this distribution. Changes in the level of P-50 will cause P-2 & P-98 to change. In addition, changes in market volatility will compress or stretch the risk profile.

Consider, for example, how a midstream producer, such as a bio-diesel company that buys soybean oil for conversion to diesel oil, could utilize risk performance estimates. Approximately 8 lbs of soybean oil are needed to produce 1 gallon of diesel fuel. In a typical month, the company may purchase 30-35 million pounds of soybean oil in order to produce approximately 4 million gallons of diesel oil. At market prices, the company may expect 20 million dollars in revenue with a low case (P-98) of −20 million dollars negative revenue and a high case (P-2) of +80 million dollars in positive revenue. The company must determine if this revenue range is acceptable, or if the company should undertake risk mitigation by taking hedging actions to change the revenue risk profile. Possible hedging actions may include engaging in financial hedges, shutting down the plant or selling back the soybeans. The company would also benefit from a feedback mechanism, such as updating the risk performance estimates systematically on a monthly or daily basis, so that the company may monitor changes in the revenue risk profile due to market prices and portfolio changes which occur during the month.

Companies with multiple asset classes have risk profiles that are best modeled by accounting for the non-correlation between assets. For example, consider two separate assets: Asset A and Asset B. The CFAR of Asset A can be determined, as can the CFAR of Asset B. However, if a firm were to own Assets A and B together, the CFAR would not simply be the sum of the two separate firms due to correlations between the two assets. That is, $$CFAR(\text{Asset } A) + CFAR(\text{Asset } B) \neq CFAR(\text{Asset } A \text{ and Asset } B) \quad (1)$$

The correlation between the two assets diversifies the risk of owning both assets and reduces the risk to the company. For example, the merging of an oil producer with a natural gas producer would not produce a company with a risk profile that would be the sum of the parts, because the non-correlation between the two asset classes in the new firm would reduce the company's risk. The precise measurement of this reduced exposure can be modeled as follows:

Owning two or more assets and/or varying asset proportions affects the company's risk profile. Consider, for example, the following firm:

$$\text{Company is short Asset A and long (Asset B+Asset C).} \quad (2)$$

For this example there are the dynamics of three different assets which have additional correlation benefits (A&B), (B&C), and (A&C). There is also the added dynamic that the company needs Asset A (which is short) to generate Assets B&C (which are long). The long positions are represented using positive signs and the short positions are represented using negative signs for the asset volumes and generate additional diversification effects. A general model for a company's risk exposures would be:

$$\sum_{s=1}^{n} Asset_s + \sum_{l=1}^{m} Asset_l, \quad (3)$$

where s=the set of short assets and includes 1 to n items, and l=the set of long assets and includes 1 to m items. If desired, a user of a risk management system can also include input fuels needed for this process.

Decision-makers at companies would benefit from the ability to make hedging decisions that lead to the development of a hedge program that supports the achievement of budgetary objectives by converting commodity prices and price curves to risked estimates of budgetary performance based on CFAR analysis using Monte Carlo simulations applied to the combined portfolio of physical and financial assets. Decision-makers could also benefit from a system that uses an iterative method to generate a performance risk profile which would track changes in performance estimates resulting from adjustments to the portfolio of assets. If the decision-makers decide that a change to the risk profile is necessary, the decision-makers may want to consider various changes to the portfolio, and then rerun the process to show the effect of the changes to the portfolio. Further, decision-makers would also benefit from a feedback mechanism, such as a method of updating the risk performance estimates systematically on a monthly or daily basis, so that the decision-makers may monitor changes in the revenue risk profile due to market prices and portfolio changes which occur during the observation period.

In view of the above issues that face decision-makers at a company, decision-makers would benefit from a methodology that is capable of the following: 1) conversion of risked price data to budgetary performance estimates; 2) identification and utilization of the correlation/non-correlation between asset classes to identify likely performance through a range of specified confidence thresholds; 3) dynamic analysis that allows the decision-makers to track the impact that changes in price, volatility and the correlation between asset classes have on enterprise performance; 4) disciplined collection and processing of data in a consistent manner; 5) systematic analysis of data through Monte Carlo simulations to develop a range of potential outcomes specific to the mix of physical and financial assets under review; and 6) periodic analysis of a portfolio at consistent and specific intervals.

Therefore, there is a need in the art for a disciplined, systematic, and periodic methodology to quantify the risk-reward of commodity price exposures to provide decision-makers with the ability to make strategic hedging decisions that are based on enterprise performance rather than commodity price(s), while incorporating all available, relevant and up-to-date market data, and document the value of all hedge decisions to demonstrate the costs and benefits as related to budgetary performance.

SUMMARY OF THE DISCLOSURE

The present disclosure introduces an automated method for risk analysis, including modeling assets of a portfolio as derivatives; collecting pricing data and volatility surfaces related to the derivatives; calculating and scaling simulated cash-flow-at-risk (CFAR) values to generate a risk profile; and evaluating the risk profile to determine if the risk profile meets predetermined risk characteristics or requires modification. Calculating and scaling simulated CFAR values may include generating a correlation matrix and/or performing Monte Carlo simulations. The method may further include monitoring and re-evaluating the simulated CFAR values. The method may also further include modifying the portfolio and repeating modeling, collecting, calculating and evaluating using the modified portfolio.

Other and further advantages of the invention will be further understood and appreciated by those skilled in the art by reference to the following specification, claims and drawings.

BRIEF DESCRIPTION OF THE DRAWINGS

FIGS. 1a-1d are flow charts of an exemplary embodiment of a performance risk management system of the invention;

FIG. 1e is a flow chart of an exemplary embodiment of a system of the invention;

FIG. 4 is a flow chart of an exemplary module configured to determine the list of pricing data necessary to value the positions in a portfolio of an embodiment of a performance risk management system of the invention;

FIG. 5 is a flow chart of an exemplary module configured to locate volatility quotes and actual volatility data for volatility quotes that are necessary to value the exposures in a portfolio of an embodiment of a performance risk management system of the invention;

FIG. 6 is a flow chart of an exemplary module configured to locate price sources and actual historical data for a list of necessary pricing data of an embodiment of a performance risk management system of the invention;

FIG. 7 is a flow chart of an exemplary module configured to collect parameters for a calculation system of an embodiment of a performance risk management system of the invention;

DETAILED DESCRIPTION

Figure 1A:
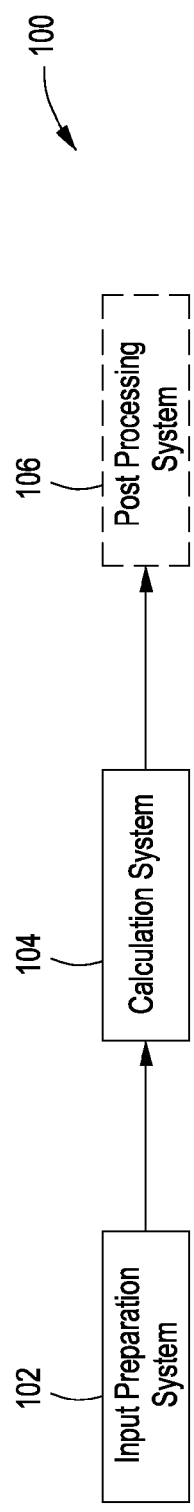
Figure 1B:
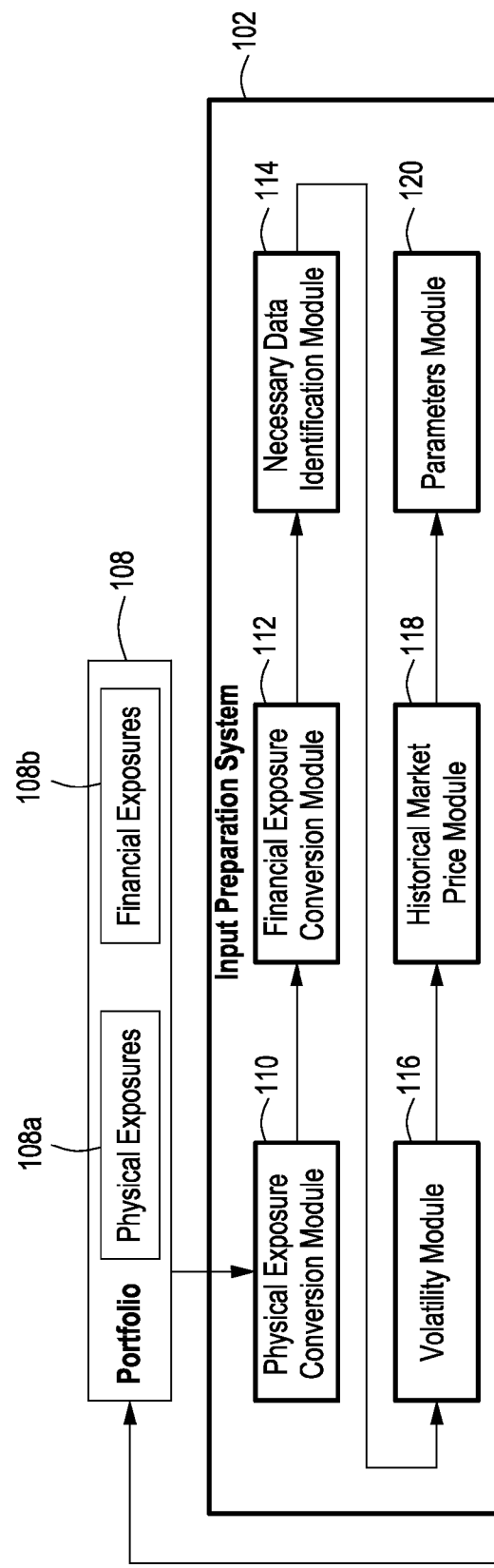

It is to be understood that the following disclosure provides many different embodiments, or examples, for implementing different features of various embodiments of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Similarly, method steps or program step execution sequences that are not expressly recited as being in a specific order may be conducted in various sequences and are not intended to be limited by the order in which they are described in the exemplary embodiments of the invention discussed herein.

Further, at least one embodiment of the present disclosure may be implemented as a program product for use with a computer system or other type of processing device. The program product may generally be configured to define functions of the embodiments (including the methods) described herein and can be contained on a variety of computer readable media. Illustrative computer readable media include, without limitation, (i) information permanently stored on non-writable storage media (e.g., read-only memory devices within a computer such as CD-ROM disks readable by a CD-ROM drive, or programmable logic devices); (ii) alterable information stored on writable storage media (e.g., floppy disks within a diskette drive or hard-disk drive, writable CD-ROM disks and DVD disks, zip disks, and writable portable memory devices); and (iii) information conveyed across communications media, (e.g., a computer, telephone, wired network, or wireless network). These embodiments also include information shared over the Internet or other computer networks, systems, and computers. Therefore, Applicants intend that any computer readable media, when carrying computer-readable instructions that are capable of performing methods or operations associated with the embodiments of the present disclosure when the instructions are executed by a processor, represent an exemplary embodiment of the present disclosure.

Further still, in general, software routines implementing various elements, parts, or embodiments of the present disclosure may be included as part of a computer operating system or as part of a specific application, component, program, module, object, or sequence of instructions, such as an executable script. Software routines typically include a plurality of instructions capable of being performed using a computer system or other type or processor configured to execute instructions read from a computer readable medium. Also, programs typically include or interface with variables, data structures, or other computer programs that reside in a memory or on storage devices as part of their operation. In addition, various programs described herein may be identified based upon the application for which they are implemented. Those skilled in the art will readily recognize, however, that any particular nomenclature or specific application that follows facilitates a description of embodiments of the present disclosure and does not limit the embodiments for use solely with a specific application or nomenclature. Furthermore, the functionality of programs described herein may use a combination of discrete modules or components interacting with one another. Those skilled in the art will recognize, however, that different embodiments may combine or merge such components or modules in a variety of ways not expressly recited in the exemplary embodiments described herein.

FIGS. 1a-1d illustrate an exemplary embodiment of a performance risk management system 100 of the invention. The exemplary performance risk management system 100 is generally configured to include an input preparation system 102, a calculation system 104, and a post-processing system 106. The performance risk management system 100 includes a plurality of modules configured to process an input portfolio 108. The portfolio may include physical exposures 108a and financial exposures 108b. The input preparation system 102 may include the following modules: a physical exposure conversion module 110, a financial exposure conversion module 112, a necessary data identification module 114, a volatility module 116, a historical market price module 118, and a parameters module 120. The calculation system 104 may include a correlation matrix module 122, a Monte Carlo module 124, and a marked to market module 126. The calculation system 104 may be a system that is separate from the input preparation system, or it may be integrated as part of the input preparation system 102. The post-processing system 106 may be a system that is separate from the input preparation system 102, or it may be integrated as part of the input preparation system 102. Further, the post-processing system 106 may include a scaling module 128, an evaluation module 130, a monitoring module 132, and a modification module 134.

Referring now to FIG. 1e, the ultimate output of the risk management system 100 may be a risk profile 152 that may be evaluated by a user 150. The performance risk management system 100 may be implemented as a software program that may be executed on a computer 154 or other processing device configured to execute a predetermined process control program representing the risk management process of the invention. The computer may include memory 155, a database 156, a printer 158 and a communications device 160. Further, the computer may be communicably coupled to a network or to other computers by the communications device 160. In another embodiment of the present disclosure, the performance risk management system 100 may be a simple programmable processing unit configured to receive inputs and generate outputs in accordance with the inputs and a predetermined process control program. The user 150 of the performance risk management system 100 may be a human user interacting with the risk management system 100 via any conventional input method, or the user 150 may be a computer or other programming device that provides automated input and receives the risk management system's 100 output for further processing.

Figure 2:
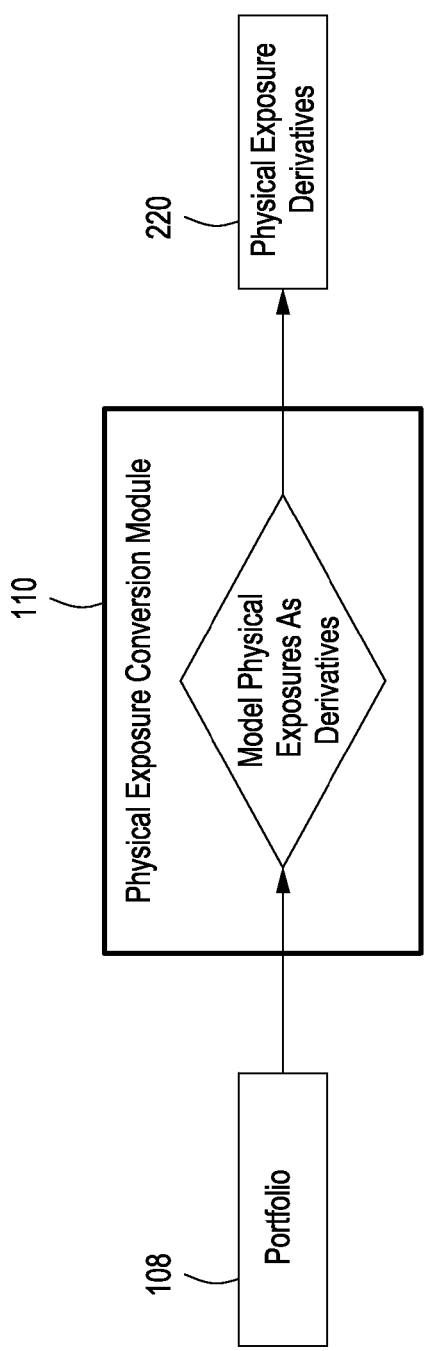
FIG. 2 is a flow chart of an exemplary module configured to identify and model physical exposures in a portfolio into financial derivatives of an embodiment of a performance risk management system of the invention.

Referring now to FIG. 2, the portfolio 108 may have one or more physical exposures 108a, and a physical exposure conversion module 110 may be configured to take one or more inputs, and output one or more physical exposure derivatives 220 (as shown in FIG. 2), which may include futures, swaps, forward positions, options (e.g., puts, calls, spreads, etc.) with their respective parameters of inputs to be valued by the calculation system. Each type of derivative has a set of parameter inputs that fully describe the particular transaction. For example, a typical futures transaction may have parameter inputs which include, without limitation, settlement currency, underlying commodity type, the number of contracts long or short, delivery price of the contract, contract size in units and the futures expiration date. Also consider a typical option transaction, which may have parameter inputs which include, without limitation, settlement currency, underlying commodity type, amount, American or European exercise type, put or call type, strike price, option expiry date, implied volatility, and futures expiry date (if the option is on a futures contract). Other derivative types may have a similar list of parameter inputs that fully describe the transaction. Each calculation system 104 may have a slightly different set of parameter inputs for each type of derivative due to varying definitions and standards of the particular system. A function of the physical exposure conversion module 110 is to model the physical exposures 108a in the portfolio 108 into physical exposure derivatives 220 that the calculation system 104 can value. Modeling the physical exposures 108a into physical exposure derivatives 220 involves finding the derivatives that best model the physical exposures 108a to reflect the commodity price risk in a market.

The physical exposure conversion module 110 analyzes the portfolio 108 to determine which physical exposures 108a are fixed volume type exposures. Fixed volume type physical exposures 108a may be modeled as physical exposure derivatives 220, such as futures and swaps. Physical exposures 108a that have an unknown volume component may be modeled using derivatives that provide asymmetrical quantity distributions, such as options. Accurate modeling of physical exposures 108a that are derived from underlying risk may require taking into account pricing settlements, such as monthly settle versus daily average price settle, basis location pricing differentials, or settlement dates of exposures. The representation of the physical exposures 108a in the portfolio 108 will generally incorporate whether the user 150 is long or short the exposure with the use of positive or negative signs for the positions. The calculation system 104 may process any number of long or short physical positions that have been modeled as physical exposure derivatives 220.

By way of explanation via example, consider a firm that is a Natural Gas Liquids producer that has some flexibility in terms of the types of natural gas liquids produced along with crude oil. The producer can change their outputs given market price information or commodity quality information. The physical exposures 108a could be modeled as long positions of zero-cost swaps for ethane, propane, iso-butane, natural gasoline, normal butane and crude oil and short positions of zero-cost swaps for natural gas. The quantities of each output commodity could change for each time period, which may be a month. Another example is a Biofuel producer that buys soybean oil as an input fuel and turns it into diesel fuel to sell at market. The Biofuel producer's physical exposures 108a might be modeled as short positions of soybean oil swaps and long positions of diesel fuel swaps. Finally, consider a producer of natural gas at multiple locations and crude oil. The physical exposures 108a of such a producer of natural gas at multiple locations and crude oil may be modeled as long positions of natural gas and crude oil by location.

Figure 3:
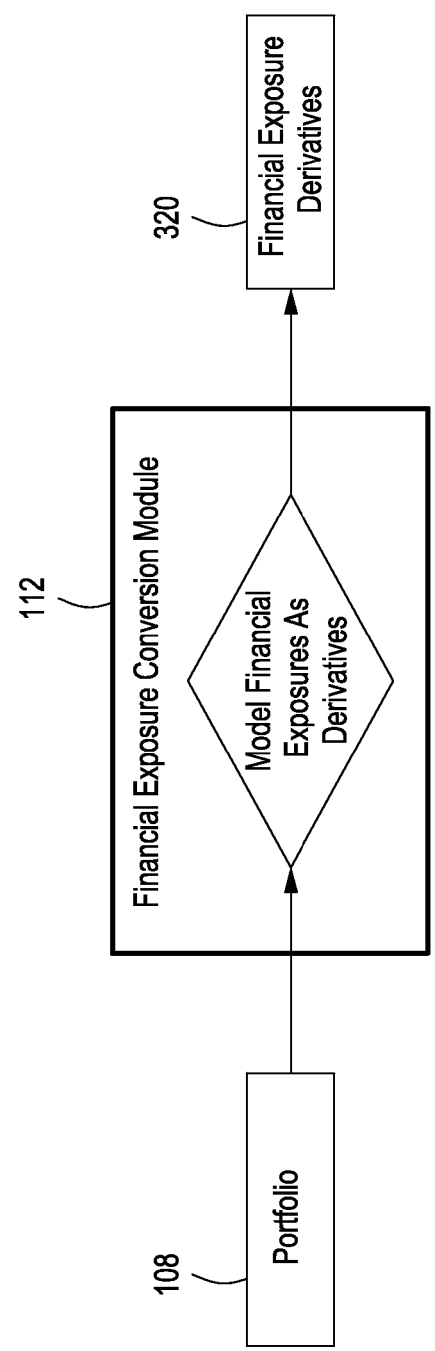
FIG. 3 is a flow chart of an exemplary module configured to identify and model financial exposures in a portfolio of an embodiment of a performance risk management system of the invention.

Referring now to FIG. 3, the portfolio 108 may also have one or more financial exposures 108b, as illustrated in FIG. 1. The financial exposure conversion module 112 takes as an input the portfolio 108, and outputs one or more financial exposure derivatives 320, such as futures, forward positions, options (puts, calls, spreads, etc.) with their respective parameters of inputs to be valued by the calculation system 104. A function of the financial exposure conversion module 112 is to identify all financial exposures 108b in a portfolio 108, and if the financial exposure 108b is not already in the form of a standard derivative structure, then the financial exposure conversion module 112 may translate each financial exposure 108b into a financial position which may be valued by the calculation system 104. Typically, financial exposures 108b are already in the form of standard derivative structures.

Referring now to FIG. 4, a necessary data identification module 114 takes one or more inputs 410, which may include the physical exposure derivatives 220 and financial exposure derivatives 320, and outputs a list of necessary pricing data 420. A function of the necessary data identification module 114 is to determine the list of pricing data necessary to value the positions in the portfolio 108. The list of necessary pricing data 420 may also include details such as market price source (Nymex, InsideFerc, IPE, etc.), the location of the quoted price, the units the price is quoted in ($/barrel, cents/gallon, $/Mmbtu, etc.), quality/grade of the commodity, and the time period of the quote (for example a spot price, a monthly forward price, etc.). The commodity market prices should generally match the commodity exposure in the portfolio 108 as closely as possible, taking into account location differential pricing, commodity quality, etc. For example, a portfolio 108 for a crude oil and natural gas producer might include three years of monthly forward prices (2 commodities×12 months×3 years=72 quotes). Commodity exposures involving international currencies (for example, Canadian natural gas) may also add a foreign exchange rate to the list of necessary pricing data 420. If the portfolio 108 contains debt, then interest rates for the loan may also be included on the list of necessary pricing data 420.

Referring now to FIG. 5, a volatility module 116 receives one or more inputs, which may include the list of necessary pricing data 420, and outputs a list of volatility quote data 520 for a desired calculation date. A function of the volatility module 116 is to locate volatility quotes and actual volatility data for the volatility quotes that are necessary to value the exposures in the portfolio 108. Volatility surfaces are used to generate volatility quotes for options at each strike price in the portfolio 108. The volatility surface for a particular asset class is a matrix of volatilities, either measured or estimated for that asset class, that are generally grouped by strike price and time to maturity.

Each day, market participants develop estimates for volatility surfaces across a range of different underlying assets, often derived from the market prices of options. Some points on a volatility surface for a particular asset can be estimated directly because they correspond to actively traded options. The rest of the volatility surface is typically determined by interpolating between these points. The volatility surface may be a flat and unchanging volatility surface, or it may be a dynamic volatility surface that may change through price and/or time. Each volatility quote in the list of volatility quote data 520 may also include the following descriptors: commodity, market/location, settlement type, and settlement date.

Further, the type of volatility quotes may be "at-the-money" or some price distance from the market price, put or call, and the volatility quote. The term "at-the-money" refers to a volatility quote for an option put or call with a strike at the market price. "At-the-money" volatility quotes are necessary for each risk exposure (asset class) for each measurement period for the time horizon analyzed. For example, for three years of monthly forward prices, which require 36 quotes (see above example), 36 at-the-money volatility quotes would be needed for each asset class for each day. The volatility quotes may be from a standard source that can provide automated quotes on a recurring basis, such as a daily or monthly basis.

Referring now to FIG. 6, a historical market price module 118 takes one or more inputs, which may include the list of necessary pricing data 420, and the historical market price module 118 outputs a list of historical market data 620, which goes back for some historical period in time, such as three months for example. A function of the historical market price module 118 is to locate price sources and actual historical data for the list of necessary pricing data 420. For each risk exposure (e.g., commodity, interest rate or foreign exchange rate) the historical market price module 118 obtains historical market prices for the desired historical period (typically three months of daily quotes). In the two asset class example above, for three months of monthly forward prices, 72 price quotes would generally need to be collected each day from market sources. Three months of data would entail 3×20 business days/month×72 quotes=4,320 quotes total. Each market price in the list of historical market data 620 may have the following descriptors: commodity, market/location, trading month, quote date, and commodity price.

Referring now to FIG. 7a parameters module 120 takes a plurality of inputs, which may include one or more input confidence levels 710a and one or more input time horizons 710b, and the parameters module 120 outputs at least a plurality of parameters 720, which may include one or more output confidence levels 720a and one or more output time horizons 720b. The input parameters 710a-b may come from the user 150 or an automated source. A function of the parameters module 120 is to collect the parameters that will determine the confidence level 720a and time horizon 720b combinations for the CFAR calculations. A confidence level 720a may be represented as a percentage, indicating the percent chance that the cash flows from deal settlements will exceed the simulated portfolio value in a given time horizon 720b. Thus, for example, a 98% confidence level 720a indicates that there is a 98% chance that the cash flows from deal settlements will exceed the simulated portfolio value as determined by the Monte Carlo module for the given the time horizon 720b. A time horizon 720b may be a point in time tied to the end of a calendar year which parallels a business' cash flow and spending timelines. The calculation system 104 may limit the length of the time horizon 720b that may be used, such as 5 or 6 years, for example.

Figure 8:
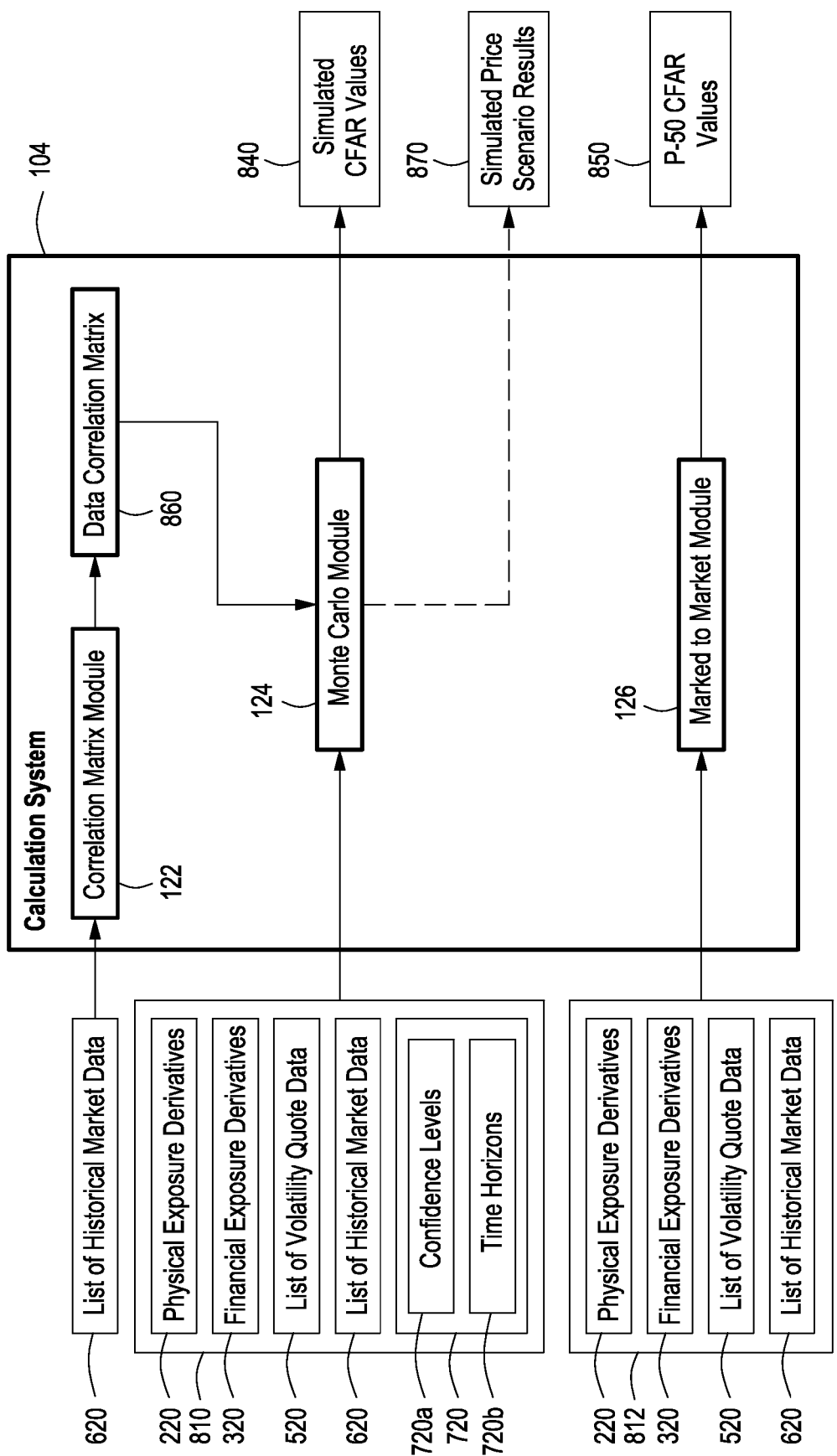
FIG. 8 is a flow chart of an exemplary module configured to perform calculation steps to obtain simulated CFAR values of an embodiment of a performance risk management system of the invention.

Referring now to FIG. 8, an exemplary calculation system 104 of the invention takes a plurality of inputs 620, 810, 812, which may include the physical exposure derivatives 220, the financial exposure derivatives 320, the list of volatility quote data 520, the list of historical market data 620, the confidence levels 720a, and the time horizons 720b. The calculation system 104 outputs at least one simulated CFAR value 840, such as P-2 and P-98 values, for the specified time horizons 720b, and the P-50 CFAR value 850. A function of the calculation system 104 is to process the calculation system inputs 620, 810, 812 and perform calculation steps to obtain simulated CFAR values 840.

The calculation system 104 may be a deal capture and/or valuation system that can perform necessary position summary, correlation matrix calculations, and Monte Carlo CFAR calculations. Deal capture and/or valuation systems should include the functionality of the following modules, which are described in more detail below: a correlation matrix module 122, a Monte Carlo simulation module 124, and a marked to market module 126. The calculation system 104 must be capable of handling all the derivative model types used to model the physical exposures 108a and financial exposures 108b in the portfolio 108, because some commercial calculation system 104 offerings may not be able to handle complex derivative structures.

One example of a complex derivative structure is a swing option in natural gas or power markets where the owner of the swing option has the possibility of taking periodic delivery of the commodity at a nominated volume on certain dates in the future for a specified price, but also has the option to change the volume according to certain fixed rules (there may be a maximum number of swings during the contract period or there may be volume minimum and maximum constraints). Another example of a complex derivative structure is a "best-of", or rainbow option, where the buyer can receive the maximum of any three assets vs. a strike price, or the minimum of any three assets vs. a strike price or other combinations of three asset payouts. The analytical models needed to value the above two examples involve difficult concepts and may require proprietary methods. Thus, some calculation systems 104 may not be able to value these types of derivatives.

The correlation matrix module 122 takes a plurality of inputs, which includes the list of historical market data 620, and outputs a data correlation matrix 860. A function of the correlation matrix module 860 is to create the data correlation matrix 860 of the historical market prices. The data correlation matrix 860 contains correlation information between each pair of prices in the list of historical market data 620. For example, if the historical market data list 620 contains n prices, then the data correlation matrix 860 will have a size of n×n, and there are generally n(n−1)/2 different pieces of correlation information in the data correlation matrix 860. The correlation coefficients measure the strength and direction of a linear relationship between two prices and range from −1 to +1.

The calculation system 104 may allow the user 150 to view the data correlation matrix 860 to get information about the correlation among prices in the historical market data list 620. For example, the user 150 may be able to see how December 2007 Nymex crude and December 2007 Nymex natural gas prices are correlated. The user 150 may use the data correlation matrix 860 to understand outputs of the calculation system 104. For example, the user 150 may be able to see how the risk of a natural gas producer would change if the user 150 added crude oil production to the user's 150 portfolio 108. Further, a user 150 may wish to track how a particular pair of prices in the historical market data list 620 correlate each month. Such information may be valuable to the user 150 if the pair of prices are a key aspect of the portfolio 108. However, a portfolio 108 may have so many physical exposures 108a and financial exposures 108b that it may be difficult to attempt to explain the behavior of the portfolio 108 using only a few selected correlations. The Monte Carlo module 124, which programmatically processes all of the correlations in the data correlation matrix 860, overcomes the limitations of only considering only a few correlations.

The Monte Carlo module 124 takes a plurality of inputs, which may include the physical exposure derivatives 220, the financial exposure derivatives 320, the list of volatility quote data 520, the list of historical market data 620, the confidence levels 720a and time horizons 720b, and the data correlation matrix 860. The Monte Carlo module 124 outputs simulated CFAR values 840 for each pair of confidence levels 720a and time horizons 720b. The simulated CFAR value 840 may be represented as an amount of money, such as a dollar amount. The Monte Carlo module 124 may also output additional detail about the simulated price scenarios. A function of the Monte Carlo module 124 is to simulate a price scenario given the market price data, value the portfolio 108 at these simulated prices, save the simulated portfolio value, repeat the process thousands of times and summarize the saved simulated portfolio values 840.

For each price scenario, the Monte Carlo module 124 simulates the price scenario to obtain simulated prices, marks the portfolio 108 to these simulated prices, and saves the resulting simulated portfolio value. The Monte Carlo algorithm used by the Monte Carlo module 124 creates a range of possible simulated values that may vary somewhat from one calculation system 104 to another, depending on the modeling method used by the particular calculation system 104. Some calculation systems 104 may output detailed results of a simulated price scenario, so that the user 150 may review the results of the simulated pricing scenarios. The price scenario simulation, including marking the portfolio 108 to simulated prices and saving the resulting simulated portfolio value, may be repeated one or more times. For example, the price scenario simulation may be repeated thousands of times.

After all price scenarios have been simulated the requisite number of times for the time horizon 720b, all of the saved simulated portfolio values are then arranged in a list that is ordered by decreasing price, and the confidence levels 720a may be determined. For example, the 2% confidence level 720a, is at the top $2^{nd}$ percentile of the list. Similarly, the 98% confidence level 720a is at the top $98^{th}$ percentile of the list. The number of simulated CFAR values 840 output by the Monte Carlo module 124 is equal to the number of confidence levels 720a times the number of time horizons 720b. For each combination of a confidence level 720a and a time horizon 720b, the Monte Carlo module 124 will output a simulated CFAR value 840. That is, each pair of confidence level-time horizon parameters 720 will create a separate simulation run in the calculation system 104. For example, two confidence levels 720a for the balance of the year, and three additional calendar years (four time windows) will output eight simulated CFAR values 840. For example, for monthly data, two confidence levels 720a for two years by month will equal 2×2×12=48 simulated CFAR values 840. The utilization of Monte Carlo techniques allows a user of the calculation system 104 to observe the impact that the non-correlation effect, also known as the portfolio effect, has on a company's risk profile. Deterministic approaches are unable to measure the non-correlation effect.

The marked to market module 126 takes a plurality of inputs, which may include the physical exposure derivatives 220, the financial exposure derivatives 320, the list of volatility quote data 520, and the list of historical market data 620. The marked to market module 126 outputs the P-50 CFAR value of the portfolio 108. The P-50 CFAR value is also known as the marked-to-market portfolio value, and may also include monthly detail, for the calculation day. The P-50 CFAR value is a benchmark for the distribution of the portfolio's 108 value. A function of the marked to market module is to value the current portfolio 108 of trades using the market pricing for a particular calculation date.

Figure 9:
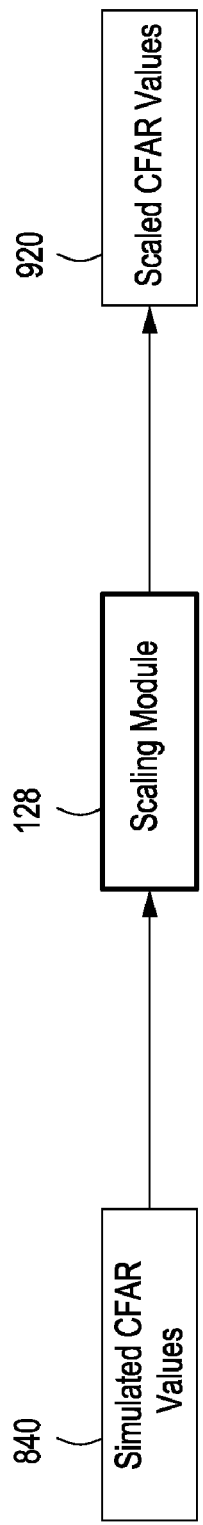
FIG. 9 is a flow chart of an exemplary module configured to provide a simulated CFAR value for a window of time of an embodiment of a performance risk management system of the invention.

Referring now to FIG. 9, a scaling module 128 takes a plurality of inputs, which may include the simulated CFAR values 840, and outputs at least one or more scaled CFAR values 920. Scaled CFAR values 920 represent an estimate of the simulated CFAR value 840 for a unit of time that is smaller than the time horizon 720b for which the simulated CFAR value 840 was calculated. A function of the scaling module 128 is to provide an approximate simulated CFAR value 840 for a smaller window of time than the time horizon 720b. The simulated CFAR values 840 calculated by the Monte Carlo module 124 may be either for a) a given time interval, such as one month or one year, or b) cumulative, representing, for example, the time span from now to the end of a month in the future, or from now until the end of the year.

If the simulated CFAR value 840 is calculated for a given time interval, such as, January 2008, February 2008, etc. then no adjustments are needed. In this case, the scaling module 128 may sum the monthly P-value changes for a year to obtain an annual scaled CFAR value 920. The annual scaled CFAR value 920 can then be used directly in the evaluation module 130.

However, if the simulated CFAR values 840 were calculated as a cumulative number, for example, from now until some date in the future, then an adjustment is necessary to obtain a scaled CFAR value 920. For example, to obtain P-2 and P-98 scaled CFAR values 920 using simulated CFAR values 840 that were calculated as a cumulative number, first, sequential periods must be subtracted from each other as follows:

$$P\text{-}2_{Time\ Interval\ i} = P\text{-}2_{Time\ i} - P\text{-}2_{Time\ i-1} \quad (4)$$

$$P\text{-}98_{Time\ Interval\ i} = P\text{-}98_{Time\ i} - P\text{-}98_{Time\ i-1} \quad (5)$$

In the above equations, $Time_i$ is a time period from the present time (Now) to the end of Time Interval i. For example, to obtain P-2 and P-98 monthly scaled CFAR values 920 for January 2009 using simulated CFAR values 840 that were calculated as a cumulative number, the following equations could be used:

$$P\text{-}2_{Jan\ 2009} = P\text{-}2_{(Now\ to\ Jan\ 31,\ 2009)} - P\text{-}2_{(Now\ to\ Dec\ 31,\ 2008)} \text{ and} \quad (6)$$

$$P\text{-}98_{Jan\ 2009} = P\text{-}98_{(Now\ to\ Jan\ 31,\ 2009)} - P\text{-}98_{(Now\ to\ Dec\ 31,\ 2008)} \quad (7)$$

Figure 10:
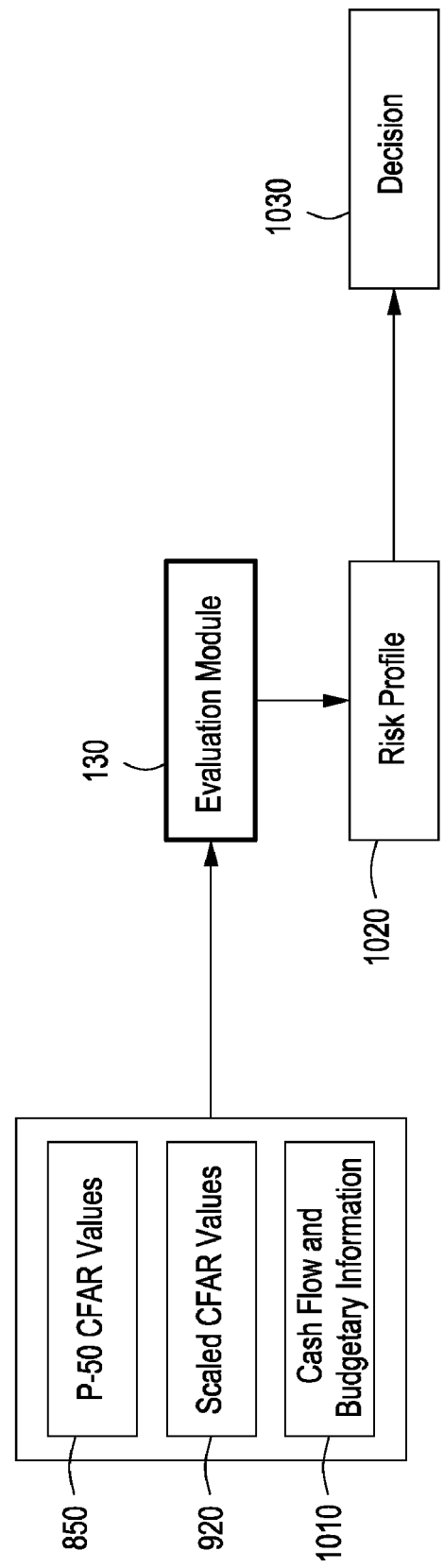
FIG. 10 is a flow chart of an exemplary module configured to determine if a portfolio meets a desired risk level of an embodiment of a performance risk management system of the invention.

Referring now to FIG. 10, an evaluation module 130 takes a plurality of inputs, which may include the P-50 CFAR value 850, the scaled CFAR values 920, and the user's 150 cash flow and budgetary information 1010. The output of the evaluation module 130 is a decision 1030 whether to leave the portfolio 108 as it is or to modify the portfolio 108. A function of the evaluation module is to determine if the portfolio 108 meets the user's 150 desired risk level and determine if changes to the portfolio 108 are necessary. The P-50 CFAR value 850 and scaled CFAR values 920 are summarized for the user 150 and presented to the user 150 as a risk profile 1020. The scaled CFAR values 920 are compared to the P-50 CFAR value 850. Comparing the P-50 CFAR value 850 and the scaled CFAR values 920 allows the user 150 to analyze the potential upside and the potential downside of the current portfolio 108. The measurement of the scaled CFAR values 920 and the P-50 CFAR value 850 is independent of budgetary requirements. The scaled CFAR values 920 and the P-50 CFAR value 850 are developed through the disciplined and impartial application of sophisticated risk metrics. The resulting scaled CFAR values 920 and the P-50 CFAR value 850 provide a benchmark against which expectations regarding corporate performance can be judged with respect to their reasonableness. The user 150 must determine if the risk profile 1020 meets acceptable risk characteristics. If the risk profile meets acceptable risk characteristics, then the risk management system 100 may continue to the monitoring module 132. Otherwise, if the risk profile 1020 does not meet acceptable risk characteristics, then the risk management system 100 may continue to the modification module 134.

A risk manager could use the risk profile 1020 to consider any number of risk characteristics. For example, a risk manager could evaluate risk characteristics such as a company's cash flow requirements for each budgetary period, including, but not limited to, general and administrative costs, debt service and capital expenditures. The risk manager could then consider the flexibility around these anticipated cash flow requirements. Take for example a producer of goods to be sold. If the P-98 estimate of the risk profile 1020 is sufficiently high to cover all expected cash flow requirements, the producer would probably decide that no hedges are necessary at the time. Continuing to use the same producer example, if the P-98 estimate of the risk profile 1020 is high enough to fund general and administrative cost and service debt, but not high enough to cover capital expenditures, the decision-maker could consider either a) adding hedges to raise the P-98 value of the portfolio 108 sufficiently high to cover all cash flow requirements (if that is possible), or b) reducing their capital expenditure budget to reduce their cash flow requirements to match the P-98 estimate of the risk profile 1020. In an extreme case, the P-50 estimate of the risk profile 1020 might be too low to fund even general and administrative cost, which would indicate that the company is in imminent danger of failing to meet its financial obligations.

Figure 11:
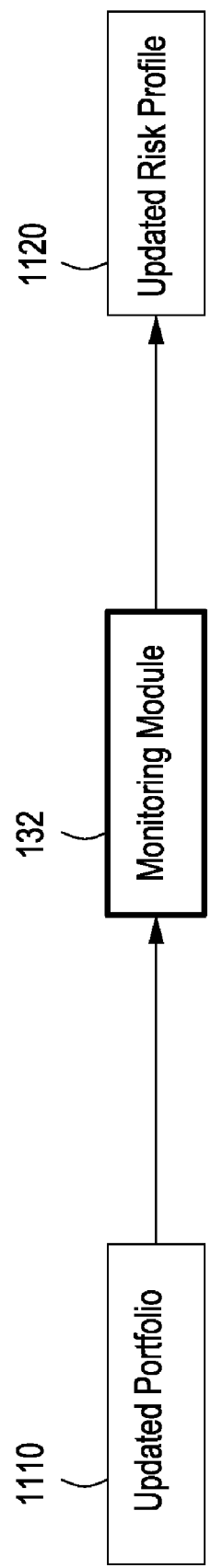
FIG. 11 is a flow chart of an exemplary module configured to monitor the risk profile of a portfolio over time of an embodiment of a performance risk management system of the invention.

Referring now to FIG. 11, a monitoring module 132 takes a plurality of inputs, which may include an updated portfolio 1110, and the monitoring module outputs at least an updated risk profile 1120. A function of the monitoring module 132 is to monitor the risk profile 1020 for a portfolio 108 over time. For example, decision-makers might alter the portfolio 108 by purchasing or selling physical exposures 108a and financial exposures 108b. A reassessment of the portfolio 108 should be performed routinely to monitor the effects that changes in price and volatility are expected to have on performance of a portfolio 108. Monitoring the portfolio 108 includes executing one or more modules of the risk management system 100 at a future time as often as desired using an updated portfolio 1110. For example, when assessing an updated portfolio 1020, the physical exposures 108a and the financial exposures 108b should be updated by rerunning the physical exposure conversion module 110 and the financial exposure conversion module 112 using the updated portfolio 1020. Further, the one or more modules of the risk management system 100 may be repeated at daily, weekly, or monthly intervals. The day that the modules of the risk management system 100 are repeated might not be during the typical end of month cycle, but may instead occur on any day of the month. Further, the risk management system 100 may be scheduled to execute one or more modules of the risk management system 100 upon the transaction date of a specific market event or upon changes to the portfolio 108 due to the occurrence of a reorganization event such as a purchase, sale, merger, or downsizing. For example, a reorganization event would modify the portfolio 108. Thus, a user 150 could rerun the monitoring module 132 using the updated portfolio 1110 as an input.

Figure 12:
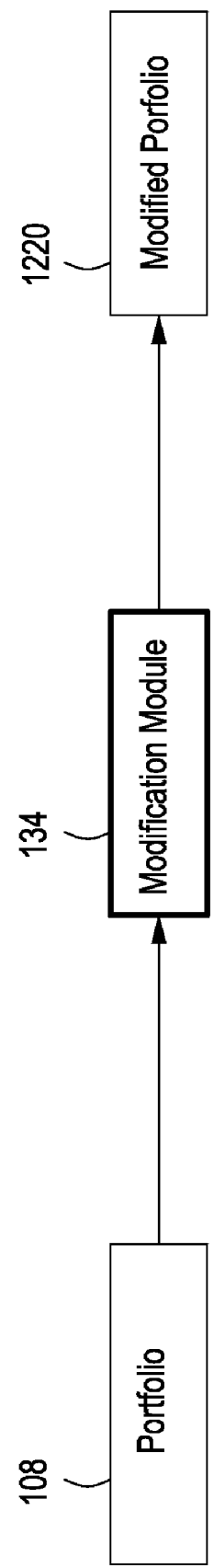
FIG. 12 is a flow chart of an exemplary module configured to allow a user to explore how portfolio changes could affect a risk profile of an embodiment of a performance risk management system of the invention.

Referring now to FIG. 12, a modification module 134 takes a plurality of inputs, which may include the portfolio 108, and outputs at least a modified portfolio 1220. A function of the modification module 134 is to allow the user 150 to explore how changes to the portfolio 108 could affect the risk profile 1020. For example, the modification module may be capable of recommending at least one potential portfolio 108 change to the user 150 after determining the effect of one or more potential changes on the portfolio 108. Changes to the portfolio 108 may include financial hedges, asset purchases or sales. Then one or more modules of the risk management system 100 may be executed using the modified portfolio 1220. The modified risk profile (not shown) of the modified portfolio 1220 can be compared to the original risk profile 1020 of the original portfolio 108 or other risk profiles 1120 of other modified portfolios 1220 to determine the most appropriate and effective change to the portfolio 108 to obtain the desired modified portfolio 1220 with the desired risk profile 1120.

The user 150 may target strategies that are appropriate and effective relative to the targeted confidence interval and minimum performance objectives sought by decision-makers. Four key corporate concerns that may influence what strategies are appropriate and effective include 1) the user's 150 risk tolerance, 2) the user's credit capacity goals, requirements, and debt covenants, 3) portfolio 108 dynamics, and 4) market opportunity. The risk management system 100 provides the user 150 with quantitative metrics that will allow the user 150 to structure a portfolio 108 in such a way that the portfolio 108 improves and maintains worst case scenarios at or above acceptable thresholds, while minimizing as much as possible the negative impact on the best case scenario. Execution costs of modifying a portfolio 108, such as the price of an option, sales commission costs, or slippage (the measured impairment to the best-case scenario on portfolio performance) may also be considered when determining the best change to the portfolio 108.

An embodiment of the present disclosure allows a company to develop a hedge program by providing risked budgetary performance estimates developed through the use of Cash-Flow-at-Risk (CFAR) analytical techniques applied to the combined portfolio 108 of physical and financial assets. An embodiment of the present disclosure enables decision-makers to make strategic decisions that are based on enterprise performance rather than commodity price(s) while incorporating all available, relevant and up-to-date market data. For example, an embodiment of the present disclosure will enable senior staff to make hedging decisions regarding the attractiveness of commodity prices from the perspective of budgetary performance. Further, the value of all hedge decisions can be documented to demonstrate the cost/benefit as it relates to budgetary performance.

Although the present disclosure has described embodiments relating to specific commodity environments, it is understood that the apparatus, systems and methods described herein could applied to other environments, such as metals, agricultural products, emissions, currencies, mortgages, interest rates, etc. or any environment that may benefit from performance risk management.

Any spatial references used herein, such as, "upper," "lower," "above," "below," "between," "vertical," "horizontal," "angular," "upward," "downward," "side-to-side," "left-to-right," "right-to-left," "top-to-bottom," "bottom-to-top," "left," "right," etc., are for the purpose of illustration only and do not limit the specific orientation or location of the structure described above. Additionally, in several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In view of all of the above, it should be readily apparent that the present disclosure introduces a method for risk analysis, including modeling assets of a portfolio as derivatives; collecting pricing data and volatility surfaces related to the derivatives; calculating and scaling simulated cash-flow-at-risk (CFAR) values to generate a risk profile; and evaluating the risk profile to determine if the risk profile meets predetermined risk characteristics or requires modification. Calculating and scaling simulated CFAR values may include generating a correlation matrix and/or performing Monte Carlo simulations. The method may further include monitoring and re-evaluating the simulated CFAR values. The method may also further include modifying the portfolio and repeating modeling, collecting, calculating and evaluating using the modified portfolio.

The present disclosure also introduces a computer program product that includes a computer-usable medium, the medium having stored thereon a sequence of instructions which, when executed by a processor, causes the processor to execute a method for risk analysis, said method including modeling assets of a portfolio as derivatives; collecting pricing data and volatility surfaces related to the derivatives; calculating and scaling simulated cash-flow-at-risk (CFAR) values to generate a risk profile; and evaluating the risk profile to determine if the risk profile meets predetermined risk characteristics or requires modification. Calculating and scaling simulated CFAR values includes generating a correlation matrix and/or performing Monte Carlo simulations. The computer program product may further include monitoring and re-evaluating the simulated CFAR values. The computer program product may also further include modifying the portfolio and repeating modeling, collecting, calculating and evaluating using the modified portfolio.

The present disclosure also introduces a system for risk analysis, including risk conversion modules configured to model assets of a portfolio as derivatives; a historical market price module configured to collect historical market pricing data related to the derivatives; a volatility module configured to collect volatility surfaces related to the derivatives; a calculation module configured to calculate simulated cash-flow-at-risk (CFAR) values; a scaling module configured to scale simulated CFAR values; and an evaluation module configured to generate a risk profile and evaluate the risk profile to determine if the risk profile meets predetermined risk characteristics or requires modification. The calculation module may include a correlation matrix module configured to generate a correlation matrix and/or a Monte Carlo module configured to perform Monte Carlo simulations. The system may further include a monitoring module configured to monitor and re-evaluate the simulated CFAR values. The system of claim 11 may further include a modification module configured to modify the portfolio and repeat the risk conversion module, the historical market price module, the volatility module the calculation module, the scaling module, and the evaluation module using the modified portfolio.

The present disclosure also introduces an automated method for risk analysis, including (a) means for modeling assets of a portfolio as derivatives; (b) means for collecting pricing data and volatility surfaces related to the derivatives; (c) means for calculating and scaling simulated cash-flow-at-risk (CFAR) values to generate a risk profile, and (d) means for evaluating the risk profile to determine if the risk profile meets predetermined risk characteristics or requires modification. Means for calculating and scaling simulated CFAR values may include means for generating a correlation matrix and/or means for performing Monte Carlo simulations. The method may further include means for monitoring and re-evaluating the simulated CFAR values. The method may also further include means for modifying the portfolio and means for repeating means for modeling, means for collecting, means for calculating and means for evaluating using the modified portfolio.

What is claimed is:

1. A method for risk analysis of physical assets, comprising:
   identifying a first physical asset class, said class comprising at least one first physical asset;
   identifying a second physical asset class, said class comprising at least one second physical asset;
   modeling the first and second physical assets as derivatives, wherein the step of modeling is accomplished by:
      identifying a first financial commodity with a correlation between the first physical asset class and the first financial commodity;
      identifying a second financial commodity with a correlation between the second physical asset class and the second financial commodity;
   collecting, with an asset analysis system, pricing data and volatility data related to the derivatives;
   the asset analysis system comprising a computer having a processor operably coupled to memory, the memory containing a plurality of computer-executable instructions,
   utilizing said asset analysis system to perform a first Monte Carlo simulation, the first Monte Carlo simulation relating said first financial commodity and said second financial commodity based on the collected pricing data and volatility data; and
   based on the Monte Carlo simulations, generating a collective risk profile for the first and second physical asset classes.

2. The method of claim 1, wherein identifying a first financial commodity comprises generating a correlation matrix utilizing said asset analysis system based on the pricing data for the first physical asset class and the first financial commodity.

3. The method of claim 1, further comprising
   identifying a predetermined risk characteristic for the risk profile;
   in the event the risk profile does not satisfy the predetermined risk characteristic, identifying a first financial a set related to either the first or second physical asset;
   utilizing said asset analysis system to perform a second Monte Carlo simulation, the second Monte Carlo simulation relating said first financial asset, said first financial commodity and said second financial commodity based on the collected pricing data and volatility data; and
   based on the second Monte Carlo simulations, generating a second risk profile for the first and second physical asset classes.

4. The method of claim 3, wherein said first financial asset is a hedgable instrument.

5. The method of claim 1, wherein said second physical asset class comprises at least two second physical assets.

6. The method of claim 1, wherein the asset classes have both correlated and non-correlated components and wherein the first Monte Carlo simulation incorporates both correlated and non-correlated components.

7. The method of claim 1, wherein at least one of said first and second physical assets are existing assets.

8. The method of claim 1, wherein at least one of said first and second physical assets are proposed assets.

9. The method of claim 1, wherein one of said first and second physical assets is an existing asset and the other of said first and second physical assets is a proposed asset.

10. The method of claim 1, wherein said first physical asset is an asset to be acquired and said second physical asset is an asset to be sold following acquisition of the first physical asset.

11. The method of claim 10, wherein said first physical asset is natural gas and said second physical asset is a natural gas liquid.

12. The method of claim 11, wherein said first physical asset is natural gas and said second physical asset class comprises at least two assets selected from the group consisting of ethane, propane, iso-butane, natural gasoline, normal butane and crude oil.

13. The method of claim 12, wherein said first physical asset is modeled as short positions of zero-cost swaps for natural gas and said second physical assets are modeled as long positions of zero-cost swaps selected from the group consisting of ethane, propane, iso-butane, natural gasoline, normal butane and crude oil.

14. The method of claim 10, wherein said first physical asset is soybean oil and said second physical asset is diesel fuel.

15. The method of claim 14, wherein said first physical asset is modeled as short positions of soybean oil swaps and said second physical asset is modeled as long positions of diesel fuel swaps.

16. The method of claim 10, wherein said first physical assets are collectively natural gas and crude oil derived from multiple locations and said second physical assets are natural gas and crude oil by location.

17. The method of claim 1, wherein at least one of said first and second financial commodities has a price curve over a selected time period.

18. The method of claim 17, wherein said price curve is a forward price curve based on projected prices.

19. The method of claim 17, wherein said price curve is a backward price curve based on historical prices.

20. The method of claim 1, wherein the step of identifying a financial commodity for each asset class comprises generating a correlation matrix for each asset class utilizing said asset analysis system based on the pricing data for the asset class and its associated financial commodity.

21. The method of claim 1, further comprising altering at least one of the physical assets and re-performing the steps of identifying, collecting, utilizing and generating.

22. A method for risk analysis, said method comprising:
identifying first and second input physical asset classes, each of said input classes comprising at least one input physical asset;
identifying third and fourth output physical asset classes, each of said output classes comprising at least one output physical asset, wherein said third physical asset is a product of said first physical asset and said fourth physical asset is a product of said second physical asset;
modeling each of the physical assets as derivatives, wherein the step of modeling is accomplished by;
identifying a first financial commodity with a correlation between the first physical asset class and the first financial commodity;
identifying a second financial commodity with a correlation between the second physical asset class and the second financial commodity;
identifying a third financial commodity with a correlation between the third physical asset class and the third financial commodity;
identifying a fourth financial commodity with a correlation between the fourth physical asset class and the fourth financial commodity;
collecting, with an asset analysis system, pricing data and volatility data related to the derivatives;
the asset analysis system comprising a computer having a processor operably coupled to memory, the memory containing a plurality of computer-executable instructions,
utilizing said asset analysis system to perform a first Monte Carlo simulation, the first Monte Carlo simulation relating each of the financial commodities based on the collected pricing data and volatility data; and
based on the Monte Carlo simulations, generating a collective risk profile for the physical asset classes.

23. The method of claim 22, wherein said first and second asset classes are substantially non-correlated.

24. The method of claim 22, said third and fourth asset classes are substantially non-correlated.

25. The method of claim 22, wherein the step of identifying a financial commodity for each physical asset class comprises generating a correlation matrix utilizing said asset analysis system, wherein the generated correlation matrix is based on the pricing data for each physical asset class and each financial commodity.

26. The method of claim 22, wherein said first and second financial commodities have a price curve over a selected time period.

27. The method of claim 22, wherein said first and second asset classes are substantially non-correlated and said third and fourth asset classes are substantially non-correlated.

28. A system for risk analysis, comprising:
a risk conversion module configured to model physical assets of a portfolio as derivatives by identifying a financial commodity for each of at least two physical assets, said financial commodity having a correlation between the asset and the financial commodity;
a historical market price module configured to collect, via a computer having a processor operably coupled to memory, historical market pricing data related to the derivatives, said pricing data comprising the market price of the derivative over a backward-looking select time period;
a volatility module configured to collect, via a computer having a processor operably coupled to memory, volatility data related to the derivatives, said volatility data comprising quantitative data reflecting the volatility of the derivative over said backward-looking time period;
a calculation module configured to calculate, via a computer having a processor operably coupled to memory, Monte Carlo simulations to yield cash-flow-at-risk (CFAR) values for said at least two physical assets; and
an evaluation module configured to generate a collective risk profile for the physical assets.

29. The system of claim 28, wherein the calculation module comprises a correlation matrix module configured to generate a correlation matrix between an asset and its associated selected financial commodity.

30. The system of claim 28, further comprising a monitoring module configured to monitor and re-calculate the simulated CFAR values after a predetermined period of time following the first Monte Carlo simulation.

31. The system of claim 28, further comprising a modification module configured to modify the physical assets of the portfolio and repeat the risk conversion module, the historical market price module, the volatility module, the calculation module, the scaling module, and the evaluation module using the modified portfolio.

32. A system for risk analysis, comprising:
means for modeling physical assets of a portfolio as derivatives by identifying a financial commodity for each of at least two physical assets, said financial commodity having a correlation between the asset and the financial commodity;
computer means for collecting pricing data and volatility surfaces related to the derivatives, said pricing data comprising the market price of the derivative over a backward-looking select time period;
computer means for calculating and scaling Monte Carlo simulations to yield cash-flow-at-risk (CFAR) values for said at least two physical assets; and
means for generating a collective risk profile for the physical assets to permit determination if the risk profile meets predetermined risk characteristics.

33. The system of claim 32, wherein means for calculating and scaling comprises means for generating a correlation matrix between an asset and its associated selected financial commodity.

34. The system of claim 32, further comprising means for monitoring and re- calculate the simulated CFAR values after a predetermined period of time following the first Monte Carlo simulation.

35. A method for risk analysis of physical assets, comprising:
identifying an input asset class, said class comprising at least one physical asset;
identifying an output asset class, said class comprising at least one physical asset;

for each asset class, identifying a financial commodity with a correlation between the asset class and the financial commodity;

collecting, with an asset analysis system, market data related to each financial commodity;

the asset analysis system comprising a computer having a processor operably coupled to memory, the memory containing a plurality of computer-executable instructions, utilizing said asset analysis system to perform a first Monte Carlo simulation, the first Monte Carlo simulation relating the input asset class and the output asset class based on the collected market data; and based on the Monte Carlo simulations, generating a collective risk profile for the input and output asset classes.

36. The method of claim 35, further comprising identifying a predetermined risk characteristic for the risk profile;

in the event the risk profile does not satisfy the predetermined risk characteristic, identifying a first financial asset related to one of the physical assets;

utilizing said asset analysis system to perform a second Monte Carlo simulation, the second Monte Carlo simulation relating the input asset class and the output asset class based on the collected market data and the first financial asset;

based on the second Monte Carlo simulation, generating a collective risk profile for the input and output asset classes.

37. The method of claim 35, wherein said physical asset in the output asset class is a product of the physical asset of the input asset class.

38. The method of claim 35, wherein the physical asset of the input asset class is a proposed asset to be acquired and the physical asset of the output asset class is a proposed asset to be sold following acquisition of the physical asset of the input asset class.

39. The method of claim 35, wherein at least one of said financial commodities has a price curve over a selected time period.

40. The method of claim 39, wherein said price curve is a forward price curve based on projected prices.

41. The method of claim 39, wherein said price curve is a backward price curve based on historical prices.

42. The method of claim 35, wherein said collected market data comprises pricing data for each asset and each financial commodity.

43. The method of claim 35, wherein said collected market data further comprises volatility data at least one asset or at least one financial commodity.

44. The method of claim 35, wherein at least two input classes are identified and at least two output classes are identified.

45. The method of claim 35, wherein the asset classes have both correlated and non-correlated components and herein the first Monte Carlo simulation incorporates both correlated and non-correlated components.

46. The method of claim 35, further comprising altering at least one of the physical assets and re-performing the steps of identifying, collecting, utilizing and generating.

* * * * *